Aug. 27, 1929. K. R. E. BADERMANN 1,725,950
AIRPLANE
Filed March 16, 1928

Inventor
Karl Robert Ernst Badermann
By Dowell and Dowell
Attorneys

Patented Aug. 27, 1929.

1,725,950

UNITED STATES PATENT OFFICE.

KARL ROBERT ERNST BADERMANN, OF SAGAN, GERMANY.

AIRPLANE.

Application filed March 16, 1928, Serial No. 262,273, and in Germany December 7, 1926.

My invention relates to airplanes and it is an object to prevent side slipping.

To this end, I provide scoops in connection with the wings of an airplane and means for rocking the scoops about axes in parallel to the fore-and-aft line of the airplane. The supporting surfaces of an airplane may consist exclusively or partly of such scoops.

Airplanes of the usual type are subject to slipping in turning when in an inclined position. It has already been proposed to provide the wings of airplanes with flat surfaces adapted to rock about fore-and-aft axes but such surfaces could not fulfill the object sought as they, or their parts, were flat faces.

According to my invention instead of flat faces I provide scoops, for instance, units constituted by two inclined faces in the shape of a roof or inverted V to constitute the supporting surfaces or parts thereof, and I mount each scoop to rock about an axis in parallel, or substantially so, to the fore-and-aft axis of the airplane. Means are provided for rocking the scoops about their axes in either direction by hand as required, and such means may be connected with the lateral control of the plane.

In the accompanying drawing an airplane equipped with scoops according to my invention is illustrated by way of example.

Figure 1:
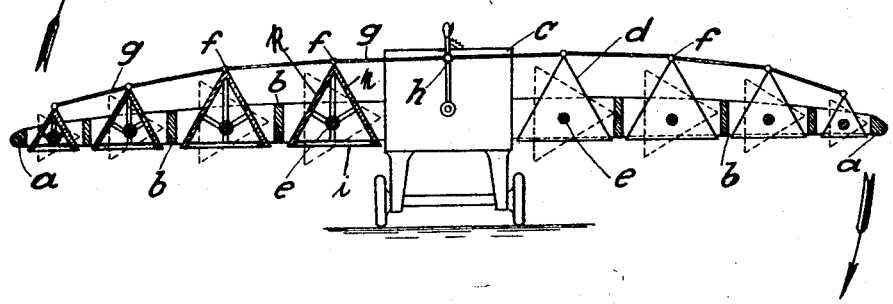
Fig. 1 is an end elevation, partly in section on I—I, Fig. 2.
Figure 2:
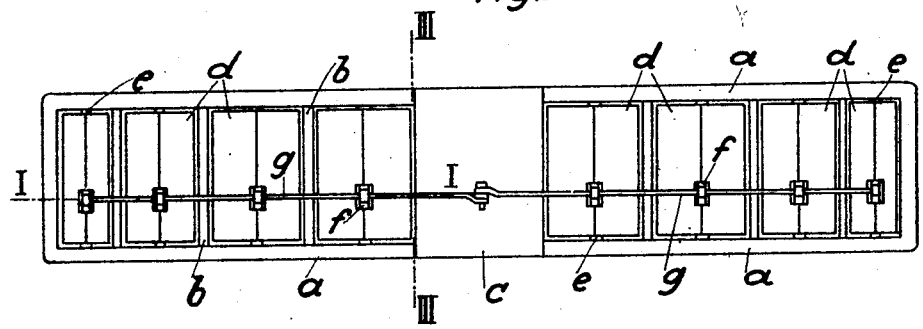
Fig. 2 is a plan view of a complete plane.

Referring now to the drawings I have shown a plane in which the supporting surfaces are completely built up from scoops, but I am not limited to this case but may provide scoops extending over any part of the surfaces.

It is also understood that I am not limited to scoops which are adapted to rock about axes strictly parallel to the fore-and-aft line, as the axes may be arranged at an angle to such line without departing from the invention.

$a$ are the wings, $b$ are ribs pitched between the front and rear spars of the wings, $c$ is the fuselage, $d$ are scoops arranged in the free spaces intermediate the ribs $b$, $e$ are the trunnions on which the scoops are adapted to rock, $f$ are eyes on the scoops, $g$ are rods connecting the eyes, and $h$ is a control lever on the fuselage to which the rods $g$ are connected.

Figure 3:
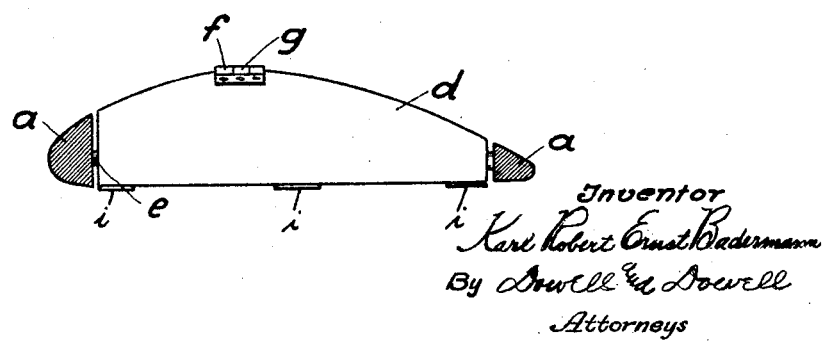
Fig. 3 is a cross section of one of its wings, drawn to a larger scale and taken on the line III—III in Fig. 2.

Preferably, as shown in Fig. 1, the scoops $d$ consist of two inclined faces $k$ and are roof- or inverted-V-shaped in cross section and shaped in conformity with the wing profile in the fore-and-aft direction, as will appear from Fig. 3. The lower ends of the faces $k$ may be connected by rods $i$.

When, for instance, the plane tends to assume the position indicated by the arrows in Fig. 1, the lever $h$ is turned to the left so as to move the scoops into the position shown in dotted lines at the right in Fig. 1. In this manner, they act like parachutes so as to hold the plane in its inclined position as firmly as it had been held in its normal position. Instead of being connected to a separate lever $h$ as shown, the rods $g$ might be connected to the rudder control so as to automatically counteract the inclination of the plane when starting to turn and in proportion to the inclination by adjusting the scoops.

The subdivision of the supporting surfaces into scoops as described, with open spaces intermediate, involves the further advantage that when landing on water the waves are subdivided and the water is allowed to escape between the scoops while in unbroken surfaces the water acts on the entire face and the stress is considerable.

I claim:

1. An airplane comprising a wing and scoops in said wing adapted to rock about axes extending in the fore-and-aft direction of said plane.

2. An airplane comprising a wing, scoops in said wing adapted to rock about axes extending in the fore-and-aft direction of said plane, and means for rocking said scoops about their axes.

3. An airplane comprising a wing, scoops in said wing adapted to rock about axes extending in the fore-and-aft direction of said plane, and means for rocking said scoops about their axes in unison.

4. An airplane comprising a wing, scoops in said wing adapted to rock about axes extending in the fore-and-aft direction of said plane, and means connected with a lateral control of said plane for rocking said scoops about their axes.

5. An airplane comprising a wing, and scoops of inverted V-section in said wing adapted to rock about axes extending in the fore-and-aft direction of said plane.

In testimony whereof I have signed my name to this specification.

KARL ROBERT ERNST BADERMANN.